US007006671B2

(12) United States Patent
Yamaguchi

(10) Patent No.: US 7,006,671 B2
(45) Date of Patent: Feb. 28, 2006

(54) PERSONAL IDENTIFICATION APPARATUS AND METHOD

(75) Inventor: Osamu Yamaguchi, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 652 days.

(21) Appl. No.: 09/808,953

(22) Filed: Mar. 16, 2001

(65) Prior Publication Data

US 2001/0026634 A1  Oct. 4, 2001

(30) Foreign Application Priority Data

Mar. 17, 2000 (JP) ............................. 2000-077209

(51) Int. Cl.
*G06K 9/00* (2006.01)
(52) U.S. Cl. ............... 382/115; 382/224; 382/190; 382/218; 340/5.53; 340/5.83; 707/7
(58) Field of Classification Search ............... 382/115, 382/116, 117, 118, 224, 225, 218, 219, 220, 382/124, 119, 190; 707/6, 7
See application file for complete search history.

(56) References Cited

U.S. PATENT DOCUMENTS

| | | | |
|---|---|---|---|
| 4,752,957 A | | 6/1988 | Maeda |
| 5,418,942 A | * | 5/1995 | Krawchuk et al. ............. 707/3 |
| 5,815,252 A | * | 9/1998 | Price-Francis ............... 356/71 |
| 5,841,888 A | * | 11/1998 | Setlak et al. ................ 382/124 |
| 5,982,912 A | | 11/1999 | Fukui et al. |
| 5,991,429 A | * | 11/1999 | Coffin et al. ................ 382/118 |
| 5,995,639 A | * | 11/1999 | Kado et al. .................. 382/118 |
| 6,072,891 A | * | 6/2000 | Hamid et al. ............... 382/116 |
| 6,275,601 B1 | * | 8/2001 | Yamaguchi et al. ......... 382/124 |
| 6,418,235 B1 | * | 7/2002 | Morimoto et al. .......... 382/118 |
| 6,430,306 B1 | * | 8/2002 | Slocum et al. .............. 382/118 |
| 6,738,978 B1 | * | 5/2004 | Hendricks et al. ............ 725/35 |

OTHER PUBLICATIONS

B. Miller, IEEE Spectrum, vol. 31, No. 2 pps. 22-30, "Vital Signs of Identity," Feb. 1994.
O. Yamaguchi, et al., Proceedings of the Third International Conference on Automatic Face and Gesture Recognition (FG98), pps. 318-323, "Face Recognition Using Temporal Image Sequence," 1998.
K. Fukui, et al, Systems and Computers in Japan, vol. 29, No. 6, pps. 49-58, "Facial Feature Point Extraction Method Based On Combination Of Shape Extraction And Pattern Matching," 1998.

* cited by examiner

*Primary Examiner*—Bhavesh M. Mehta
*Assistant Examiner*—John Strege
(74) *Attorney, Agent, or Firm*—Oblon, Spivak, McClelland, Maier & Neustadt, P.C.

(57) ABSTRACT

A personal identification apparatus includes a storage device which stores specific information of each of registered persons, an extraction device capable of extracting specific information of an object person from the object person, a classification device which classify whether the object person is included in the registered persons by comparing the pieces of specific information of the registered persons, which are stored in the storage device, with the specific information of the object person, which is extracted by the extraction device, and a registered device operation device configured to sort the order of the pieces of specific information of the registered persons, which are stored in the storage device, in accordance with the use situation of the registered persons, or set whether the registered persons are to be subjected to classification.

6 Claims, 7 Drawing Sheets

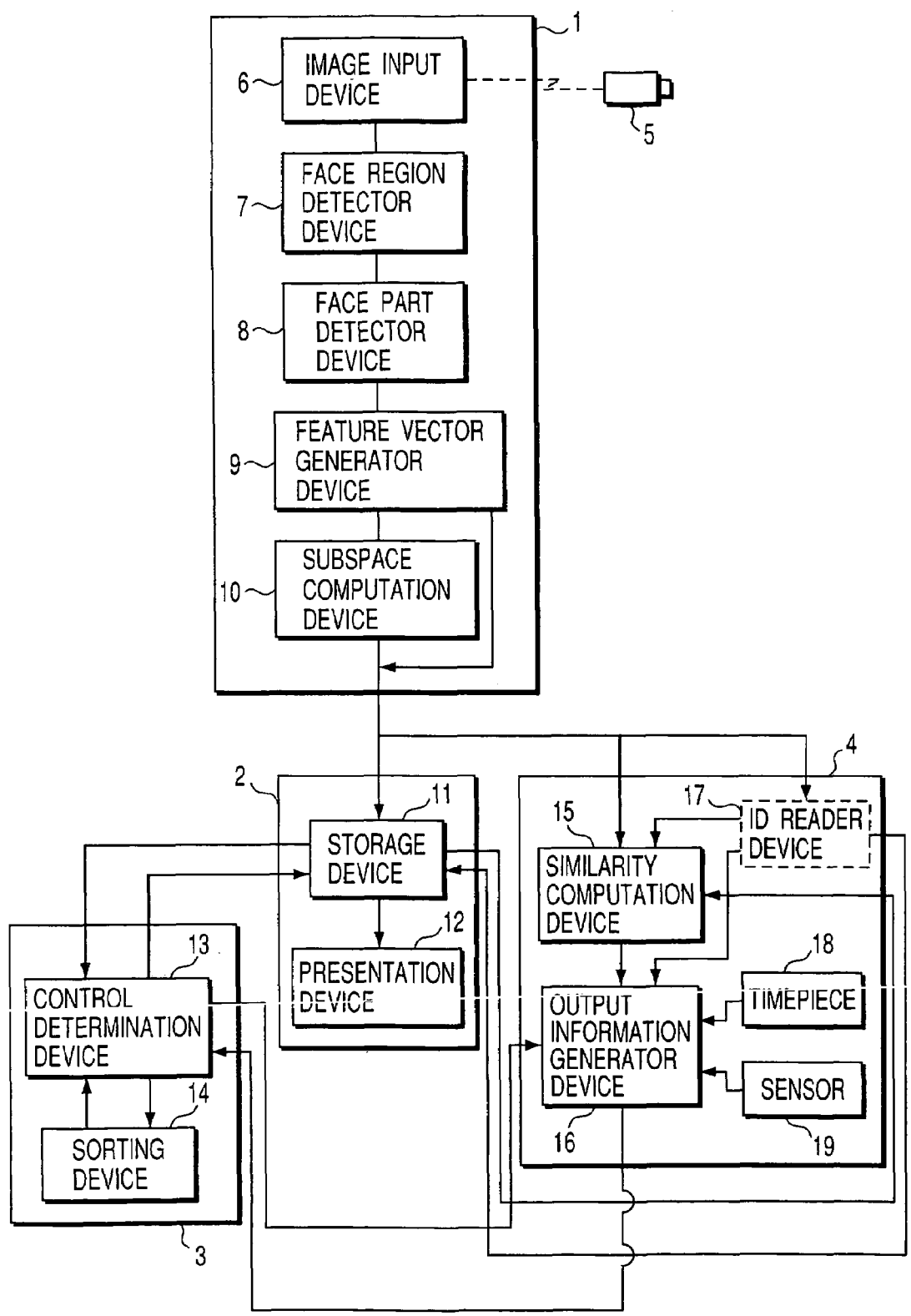
F I G. 1

| REGISTRATION NUMBER | NAME | IDENTIFICATION DICTIONARY | REGISTRATION DATE/TIME | CLASSIFICATION TIME | NUMBER OF TIMES OF CLASSIFICATION | SELECTION FLAG | OTHERS |
|---|---|---|---|---|---|---|---|
| 001 | NAME 1 | IDENTIFICATION DICTIONARY 1 | REGISTRATION DATE/TIME 1 | 00.22.00 | 20 | ✓ | OTHERS |
| 002 | NAME 2 | IDENTIFICATION DICTIONARY 2 | REGISTRATION DATE/TIME 2 | 00.00.20 | 10 | ✓ | OTHERS |
| 003 | NAME 3 | IDENTIFICATION DICTIONARY 3 | REGISTRATION DATE/TIME 3 | 23.55.32 | 180 | ✓ | OTHERS |
| 004 | NAME 4 | IDENTIFICATION DICTIONARY 4 | REGISTRATION DATE/TIME 4 | 16.55.35 | 90 | ✓ | OTHERS |
| 005 | NAME 5 | IDENTIFICATION DICTIONARY 5 | REGISTRATION DATE/TIME 5 | 00.00.05 | 40 | ✓ | OTHERS |
| 006 | NAME 6 | IDENTIFICATION DICTIONARY 6 | REGISTRATION DATE/TIME 6 | 08.06.05 | 27 | ✓ | OTHERS |
| 007 | NAME 7 | IDENTIFICATION DICTIONARY 7 | REGISTRATION DATE/TIME 7 | 10.22.33 | 2 | ✓ | OTHERS |

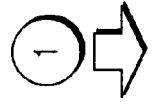

| REGISTRATION NUMBER | NAME | IDENTIFICATION DICTIONARY | REGISTRATION DATE/TIME | CLASSIFICATION TIME | NUMBER OF TIMES OF CLASSIFICATION | SELECTION FLAG | OTHERS |
|---|---|---|---|---|---|---|---|
| 003 | NAME 3 | IDENTIFICATION DICTIONARY 3 | REGISTRATION DATE/TIME 3 | 23.55.32 | 180 | | OTHERS |
| 006 | NAME 6 | IDENTIFICATION DICTIONARY 6 | REGISTRATION DATE/TIME 6 | 08.06.05 | 27 | ✓ | OTHERS |
| 007 | NAME 7 | IDENTIFICATION DICTIONARY 7 | REGISTRATION DATE/TIME 7 | 10.22.33 | 2 | ✓ | OTHERS |
| 004 | NAME 4 | IDENTIFICATION DICTIONARY 4 | REGISTRATION DATE/TIME 4 | 16.55.35 | 90 | ✓ | OTHERS |
| 005 | NAME 5 | IDENTIFICATION DICTIONARY 5 | REGISTRATION DATE/TIME 5 | 00.00.05 | 40 | ✓ | OTHERS |
| 001 | NAME 1 | IDENTIFICATION DICTIONARY 1 | REGISTRATION DATE/TIME 1 | 00.22.00 | 20 | ✓ | OTHERS |
| 002 | NAME 2 | IDENTIFICATION DICTIONARY 2 | REGISTRATION DATE/TIME 2 | 00.00.20 | 10 | ✓ | OTHERS |

PERSONAL IDENTIFICATION APPARATUS AND METHOD

CROSS-REFERENCE TO RELATED APPLICATIONS

This application is based upon and claims the benefit of priority from the prior Japanese Patent Application No. 2000-077209, filed on Mar. 17, 2000, the entire contents of which are incorporated herein by reference.

BACKGROUND OF THE INVENTION

1. Field of the Invention

The present invention relates to a personal identification apparatus and method and, more particularly, to a personal identification apparatus and method using information inherent to a registered person for identification.

2. Description of the Background Art

In recent years, security necessary for, e.g., access control for a specific place and, especially, security using human biometrical information has received a great deal of attention. In A personal identification method using human biometrical information, features such as the face, voiceprint, fingerprint, iris, nail, and hair related to bodily features inherent to a person are extracted, and the features are identified as personal specific information stored in advance, thereby classifying the person.

Personal identification methods for a conventional personal identification apparatus using biometrical information are classified into two schemes: "personal identification" and "personal classification". In the "personal identification" method, it is determined whether an object person to be identified who uses the personal identification apparatus is a registered person who has already been registered and also a person who can obtain permission. In the "personal classification" method, it is determined whether an object person who uses the personal identification apparatus is one of registered persons who have already been registered. Processing based on "personal identification" may be executed for a person for whom "personal classification" is done first, and it may determine whether the object person is a registered, permitted person.

For the personal identification or personal classification, each personal information, i.e., stored in a database which stores the specific information. The specific information of the object person is extracted by the extraction device in the personal identification apparatus, which extracts the specific information of the object person. The extracted specific information is compared with all of a plurality of pieces of specific information stored in the database, thereby classifying between the registered persons and the object person.

A case wherein the personal identification apparatus is an access control system will be examined.

Analysis of the usual use forms of persons to be identified who use the access control system may reveal that some specific registered persons often use the system, i.e., are permitted to enter a specific place by the access control system and enter there many times, and some registered persons use the access control system only once in several months.

In addition, if the number of registered persons is large, the verification is time-consuming because the specific information of the object person must be compared with each of the pieces of specific information of the registered persons until the specific information of the object person matches the specific information of a registered person. Especially, when the pieces of specific information of the registered persons are compared with the specific information of the object person in the order of registration, the later the registration time is, the longer the verification time becomes. This may prolong the standby time for the object person for identification. The pieces of specific information of the registered persons are arranged in the order of registration of the registered persons, as described above, or in the order of name, staff number, or the like. The specific information of a new registered person is registered after the already stored information, and this order is fixed and stored in the database or the like.

Furthermore, when a plurality of pieces of specific information (e.g., fingerprint and face) of the object person are compared with the pieces of stored specific information of the registered persons to improve the accuracy of security, the comparison time becomes longer, resulting in a further increase in standby time for the object person.

BRIEF SUMMARY OF THE INVENTION

It is therefore an object of the present invention to provide a personal identification apparatus which reduces the time required for verification between registered persons and an object person and suppresses the standby time for verification of the object person by appropriately changing the registration order of the registered persons in accordance with the use situation of the registered persons on, e.g., an access control system, and a method therefor.

According to the present invention, there is provided a personal identification apparatus comprising a storage device which stores specific information of each of registered persons, an extraction device which can extract specific information of an object person from the object person, a classification device which classifies whether the object person is included in the registered persons by comparing the pieces of specific information of the registered persons, which are stored in the storage device, with the specific information of the object person, which is extracted by the extraction device, and a registered information operation device which sorts an order of the pieces of specific information of the registered persons, which are stored in the storage device, in accordance with a use situation of the registered persons, or sets whether the registered persons are to be subjected to classification.

According to the present invention, there is also provided a personal identification method comprising storing specific information of each of registered persons in a storage device, extracting specific information of an object person from the object person, classifying whether the object person is included in the registered persons by verifying the pieces of specific information of the registered persons, which are stored in the storage device, with the specific information of the object person, which is extracted in the extracting step, and performing operation of sorting an order of the pieces of specific information of the registered persons, which are stored in the storage device, in accordance with a use situation of the registered persons, or setting whether the registered persons are to be subjected to classification.

The registered information operation device sorts the pieces of information of the registered persons in accordance with the elapse time from the preceding classification time or the frequency of classification and makes it possible to execute classification preferentially for persons with high use frequency.

The registered information operation device makes it possible to select persons to be subjected to classification from the registered information, thereby preventing any unnecessary classification operation and decreasing the computation cost.

When the priority order of classification is low, the classification device requests retry or performs classification using another feature. With this processing, a person who rarely uses the apparatus can be double-checked, and high-level security can be ensured.

The registered information storage device has a presentation function of presenting information such as the priority order of classification to the administrator. The administrator can easily acquire information representing who uses the apparatus at which frequency, and high-level security can be ensured.

The personal identification apparatus using biometrics may require control to exclude, from the classification targets, a specific person who is registered in the registered information storage device or set a valid date. For example, control is required to inhibit a person from using the authentication system only during a certain period because his/her feature used for biometric authentication cannot be extracted because of injury or the like, or set specific groups in the database and make the system to classify a group A at a time and a group B at another time. Hence, when a function of selecting the data is added, the convenience can be improved.

The personal identification apparatus can be applied not only to a management system such as an access control system but also a personal classification technology for a compact authentication device or pet robot having no large storage unit, and can be used to identify data of several persons at a high speed.

BRIEF DESCRIPTION OF THE SEVERAL VIEWS OF THE DRAWING

FIG. 1 is a block diagram of a personal identification apparatus according to an embodiment of the present invention;

FIGS. 3A and 3B are views showing information sorting executed by a registered information operation device of the present invention;

DETAILED DESCRIPTION OF THE INVENTION

Figure 2:
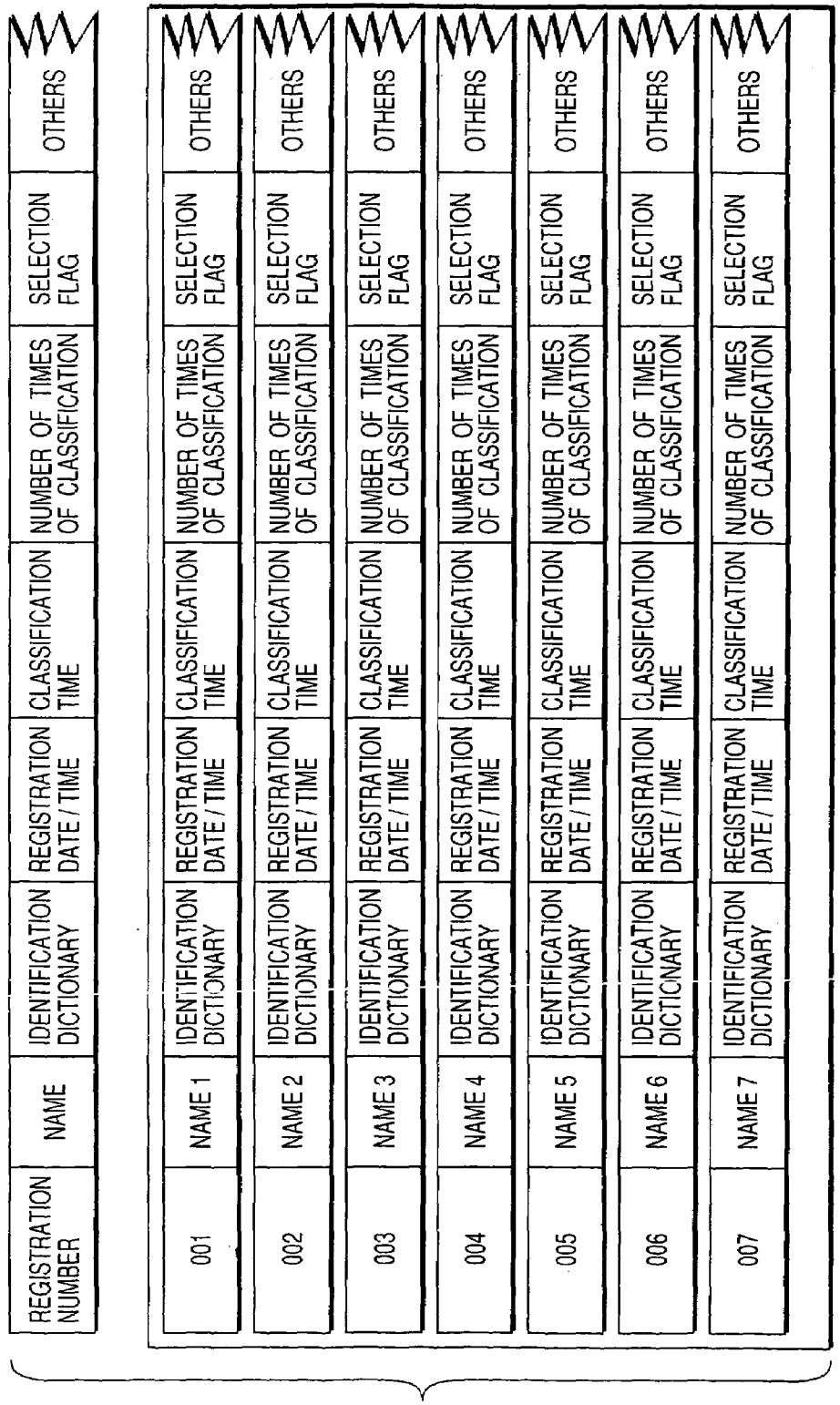
FIG. 2 is a view showing information registered in a registered information storage device according to an embodiment of the present invention.

The arrangement of an embodiment of the present invention will be described below with reference to the accompanying drawing.

FIGS. 1 to 5 are views showing a personal identification apparatus of the present invention, in which signals flow in the directions of arrows. A human face will be used here as specific information. However, information related to a bodily feature such as a fingerprint, voiceprint, hair, or nail can also be used as specific information, or a physical key such as an IC card can also be used as specific information. Security can be improved using a plurality of pieces of specific information.

FIG. 1 is a block diagram of the personal identification apparatus of the present invention. The personal identification apparatus comprises a feature extraction device 1 which extracts the specific information of an object person, a registered information storage device 2 which stores the specific information of each registered person, a registered information operation device 3 which sorts the pieces of specific information stored in the registered information storage device 2 in accordance with the use situation of the registered persons or setting whether the registered persons are to be subjected to classification, and a classification device 4 which compares each specific information stored in the registered information storage device 2 with the specific information of the object person.

The feature extraction device 1 comprises an image input device 6 which receives an image from a TV camera sensing the face as the specific information of the object person, a face region detector 7, a facial parts detector 8, a feature vector generator 9, and a subspace computation device 10. As the TV camera 5, a TV camera capable of sensing an object under visible light or, e.g., at night when a region to be captured is dark, an infrared camera using light other than visible light can be used. A plurality of TV cameras or different TV cameras may be used.

The registered information storage device 2 has a storage device 11 and presentation device 12. The registered information operation device 3 is formed from a control determination device 13 and sorting device 14. The classification device 4 comprises a similarity computation device 15, output information generator 16, ID reader 17, timepiece 18, and sensor 19.

A personal identification method for the personal identification apparatus with the above arrangement will be described.

The face image of an object person is captured by the TV camera 5, and the captured image is A/D-converted by the image input device 6. The A/D-converted image is sent to the face region detector 7.

The face region detector 7 detects the region of the face of the object person from the received image. As the face region detection method, for example, correlation values are obtained while moving a template prepared in advance in the image, thereby detecting a place with the largest correlation value as the face region. Alternatively, for example, a background image prepared in advance without capturing the object person with the TV camera 5 is compared with the image of the object person, which is captured with the TV camera 5, in units of pixels, and correlation values for the respective pixels are obtained, thereby detecting the face region. For example, a place with the largest correlation value is detected as the face region. The eigenface method or subspace method may also be used to detect the face region.

For the image after face region detection, facial parts such as eyes, nose, and mouth and their positions are detected by the facial parts detector 8. To detect the facial parts, for example, a method described in Kazuhiro Fukui and Osamu Yamaguchi, "Facial Feature Point Extraction Method Based on Combination of Shape Extraction and Pattern Matching", Systems and Computers in Japan, vol. 29. No. 6, 1998, the entire contents of which are incorporated herein by reference is used.

On the basis of the detected facial parts and their positions, the feature vector generator 9 sets the face region to predetermined size and shape and converts the set face region into grayscale information of each pixel. The grayscale information is used as the feature of the object person. In this case, grayscale values in the face region having m pixels×n pixels are directly used as feature information, and m×n dimensional information are used as feature vectors.

The subspace computation device 10 obtains a correlation matrix $C_d$ from the feature vectors on the basis of the features of the face region of the object person. Normalized orthogonal vectors (eigenvectors) are computed by K-L expansion the correlation matrix $C_d$, thereby obtaining a subspace. This subspace is expressed using an eigenvector set which is formed by selecting k eigenvectors corresponding to eigenvalues in descending order of eigenvalues. Here, the correlation matrix $C_d = \Phi_d A_d \Phi_d T$ is diagonalized to obtain an eigenvector matrix $\Phi$.

The pieces of specific information of registered persons, which are stored in the registered information storage device 2, are registered in the registered information storage device 2 in advance by the above-described operation to form an identification dictionary (to be simply referred to as a dictionary hereinafter) used for identification between the object person and the registered persons. To store the specific information of a registered person first, the information is sent from the feature vectors from the feature vector generator 9 or the subspace from the subspace computation device 10, and stored.

The storage device 11 stores, for each registered person, pieces of information including the captured image or extracted feature as the specific information of the registered person, the dictionary, the name of the registered person, the registration number, the registration date when these pieces of information are stored in the storage device 11, and the use situation such as the date/time and place of identification of the registered person. The pieces of information registered for each registered person have, e.g., the data format as shown in FIG. 2. At the initial time, the pieces of information are arranged in the order of, e.g., registration.

The presentation device 12 can present the pieces of information stored in the storage device 11, including its sequential structure, to the administrator who administrates the personal identification apparatus, as needed. For example, when the administrator requests the personal identification apparatus to present "persons to be identified, who recently used the personal identification apparatus" or "images of persons who used the personal identification apparatus from X to Y o'clock", pieces of information stored in the storage device 11 are read out and presented to the presentation device 12. The administrator can easily obtain necessary information at a necessary time.

The registered information operation device 3 reads out the pieces of information registered in the registered information storage device 2, sorts and appropriately updates the information under an arbitrary condition, sends the pieces of sorted information to the registered information storage device 2, and causes it to store them.

More specifically, the control determination device 13 determines the sorting method for the information stored in the registered information storage device 2, computes the time required for determination of sorting, or changes the items. The sorting device 14 receives the stored information to change the order of registered information, sorts the pieces of received information in accordance with the reference designated by the control determination device 13, and transmits the sorted information to the registered information storage device 2.

To sort the information, for example, the quick sort algorithm is used. However, any other method can be used as long as it can sort the information.

As shown in FIGS. 3A and 3B which show an example of a change in information sorting, the administrator causes the registered information operation device 3 as needed to sort the pieces of information, which are arranged first in the order of registration number, in the ascending order of elapse times from the last classification of the object person and registered person by the personal identification apparatus. For a registered person with a short elapse time, the order for display (storage) is set to a small number position. To the contrary, for a registered person with a long elapse time, the order is set to a large number position.

As for the timing of sorting, sorting can be automatically performed at a predetermined time interval or when classification between the registered persons and the object person has been executed, or performed by the administrator as needed. The sorting can be executed for all pieces of information or only pieces of classified information. When the pieces of information are sorted, the classification operation for the registered persons and object person by the classification device 4 can be efficiently performed.

The pieces of registered persons stored in the registered information storage device 2 can be appropriately selected depending on whether they are information to be identified. For example, when it is obvious that a registered person is not permitted to enter a specific room although his/her information is stored, a corresponding selection flag (ON/OFF) in FIGS. 3A and 3B are turned off, thereby setting a selection disable state.

The classification operation by the classification device 4 for the (pieces of information of) registered persons and the (information of) object person will be described next.

A person is classified by comparing information extracted by the feature extraction device 1, e.g., the feature obtained by the feature vector generator 9 or the subspace obtained by the subspace computation device 10 with the dictionary stored in the registered information storage device 2.

More specifically, the similarity computation device 15 compares, for example, the feature from the feature extraction device 1 with dictionaries from the registered information storage device 2 and computes the similarities. In computing the similarities, the stored dictionaries are verified in the order of arrangement, and the most similar dictionary is selected as the identification result. For this identification, if the feature from the feature vector generator 9 is used, the subspace method or multiple similarity method can be used. In this embodiment, a mutual subspace method provided by U.S. Pat. No. 4,752,957, the entire contents of which are incorporated herein by reference is used.

In identification operation, first, the registration number or the like is read by the ID reader 17 using a card, registration number, password, key, or the like, and the similarity between the extracted face of the object person and the dictionary of the face of each registered person corresponding to the card or number of the registered person is computed. Only when the result exceeds a preset threshold value, the object person is to be identified the registered person.

The computed similarity, the classification date/time read by the timepiece 18, and the classified state obtained by the sensor 19 are sent to the registered information operation device 3.

The operation of the classification device 4 changes depending on whether the object person is to be classified or identified.

Classification

To classify whether the object person is one of the registered persons, who is a limited registered person satisfying a certain condition, verification is performed for only k pieces of information at higher-order positions in accordance with the order of sorted information or for only pieces of information selected by the selection flags. As the value k, a number necessary for operation is set in consideration of tradeoff with the time that allows good response of classification.

(1) Classification Processing When the Predetermined Number k of Persons Who Satisfy a Condition are to be Classified The k pieces of information to be classified are read out from the registered information storage device 2. The similarity between each readout information and the information of the object person is computed. Information having the highest similarity is selected from the computation results, and the selected information is output as a classification result. To further determine whether the selected information is most appropriate, the similarity may be compared with a threshold value and authenticated when the similarity is equal to or larger than the threshold value.

(2) Classification Processing for a Person Selected by Selection Processing

Of the pieces of information stored in the registered information storage device 2, only pieces of information for which a condition is set by the selection flag or the like are read out. The similarity between each readout information and the information of the object person is computed. Of the computation results, information having the highest similarity is output as a classification result. To further determine whether the selected information is most appropriate, the similarity may be compared with a threshold value and authenticated when the similarity is equal to or larger than the threshold value.

A case wherein the classification fails in processing operations (1) and (2) will be examined.

The classification by processing operations (1) and (2) probably fails due to the following three reasons.

(a) The classification is not executed because the object person is not included in the k selected persons.

(b) The classification is not executed although the object person is included in the k selected persons.

(c) The classification is not executed because the object person is a person other than the registered persons.

In the case of reason (a), the object person can be classified by executing classification processing again for (n-k) pieces of information of registered persons.

In the case of reason (b), classification needs to be executed again, or the classification processing needs to be executed by another means.

In the case of reason (c), since the registered person is not recorded on the registered information storage device 2, the classification processing is not successfully executed.

Figure 4:
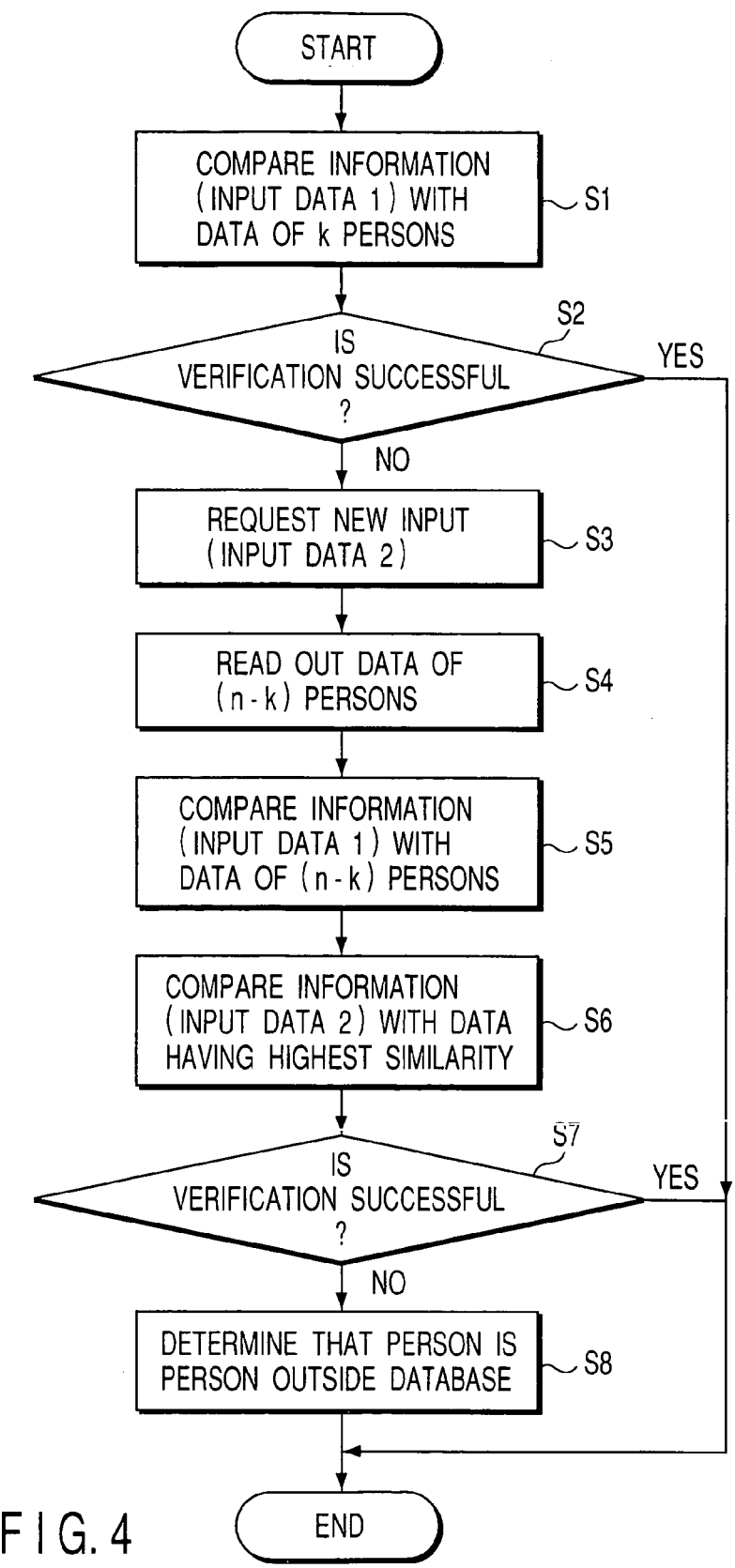
FIG. 4 is a flow chart for explaining classification operation according to an embodiment of the present invention.

The retry operation will be described with reference to the flow chart shown in FIG. 4.

First, the information of the object person as input data is compared with k registered persons (pieces of information up to the k-th person) (S1). This input data will be referred to as input data D1 so that it can be distinguished from data to be acquired by the feature extraction device 1 from the object person later. When the input data D1 is compared with the pieces of information of the registered persons, and classification is successfully done, the result can be used without any problem (S2). If the verification fails, the information of the object person may match one of the remaining pieces of information after the k-th person, which are stored in the registered information storage device 2, so comparison with the remaining personal data is necessary. Multiple check is necessary to compare information that is probably present at a lower-order position with the information of the object person. Hence, a new feature is extracted again from the object person. The extracted input data will be referred to as input data 2 (S3). After that, the data of the (n-k) persons are read out (S4).

The classification device 4 compares the input data D1 with each of the pieces of information (dictionaries) of the (n-k) persons after the kth person, which are stored in the registered information storage device 2 (S5), extracts a dictionary with the highest similarity, and compares the input data 2 with the extracted dictionary (S6). It is determined whether verification between the input data 2 and the dictionary is successfully done (S7). If the comparison is successfully done, it can be determined that the object person is a registered person stored at a lower-order position in the registered information storage device 2, and the processing is ended. If the comparison fails, it is determined that the object person is a person who is not registered in the registered information storage device 2 (S8).

The classification by processing (2) fails probably due to the following three reasons.

(a) The classification is not executed because the object person is not included in members selected in advance.

(b) The classification fails although the object person is a member selected in advance.

(c) The classification is not executed because the object person is a person other than the registered persons.

Figure 5:
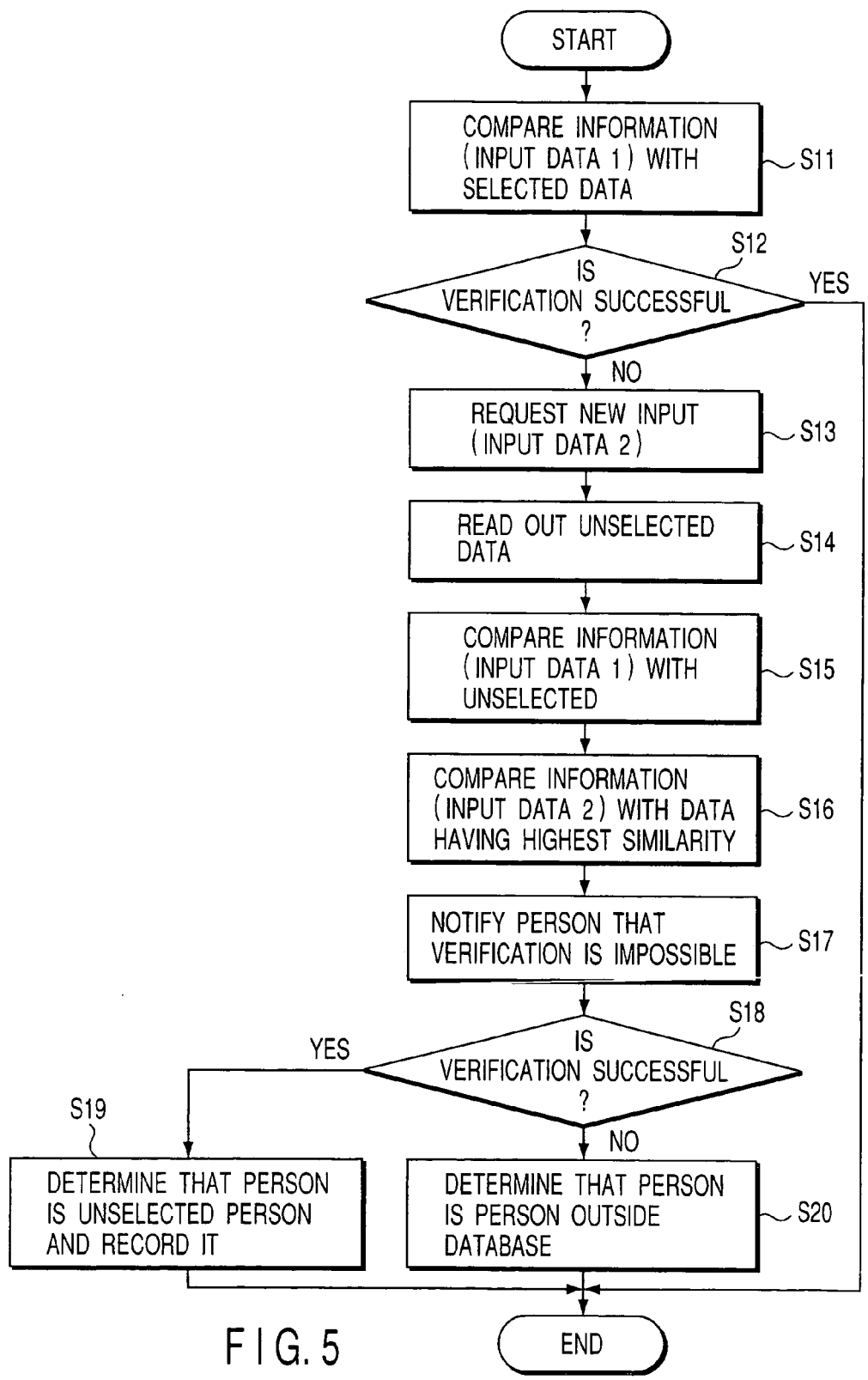
FIG. 5 is a flow chart for explaining classification operation according to another embodiment of the present invention.

The re-classification operation will be described with reference to the flow chart shown in FIG. 5.

First, the information of the object person as input data is compared with the dictionaries of all registered persons registered as selected members (S11). This input data will be referred to as input data D1 so that it can be distinguished from data to be acquired by the feature extraction device 1 from the object person later. When the input data D1 is successfully compared with any one of the dictionaries of the selected members, the object person can be classified as a selected member, and the processing is ended (S12).

If the verification fails, probably, the retry fails, or the object person is a registered person other than the selected members or a person other than the registered persons.

If such verification fails, a new input is requested (S13), the input data D1 is stored in the registered information storage device 2 again, and multiple check is performed. A new feature is extracted from the object person, and the extracted feature is defined as input data 2. Unselected data are read out (S14), and the input data D1 is compared with the pieces of unselected registered persons (S15). After that, a dictionary with the highest similarity is extracted, and the extracted dictionary is compared with the input data 2 (S16).

It is determined next whether the verification is successfully done (S18). If YES in step S18, it is determined that the object person is a registered person but an unselected member, and a result "not permitted" or "registered but unselected member" is presented to the object person. At the same time, that the object person is an unselected member is recorded on the registered information storage device 2, including the classification time and the number of times of classification (S19). If NO in step S18, it is determined that the object person is a person who is not stored in the registered information storage device 2, and information "not permitted" or the like is presented to the object person (S20).

Identification

First, information (to be referred to as input data D1) extracted by the feature extraction device 1 from the object person is compared with k pieces of information (sorted) of dictionaries stored in the registered information storage device 2. If the verification is successfully done, a result such as "permitted" is presented to the object person. If the verification fails, a new feature (to be referred to as input data 2) is extracted from the object person, and the input data D1 is compared with the k-th and subsequent dictionaries. If the verification is successfully done, a result such as "permitted" is presented to the object person. If the verification fails, a dictionary having the highest similarity with respect to the input data D1 is compared with the input data 2. If the verification is successfully done, information such as "permitted" is presented to the object person. If the verification fails, information such as "not permitted" is presented.

Figure 6:
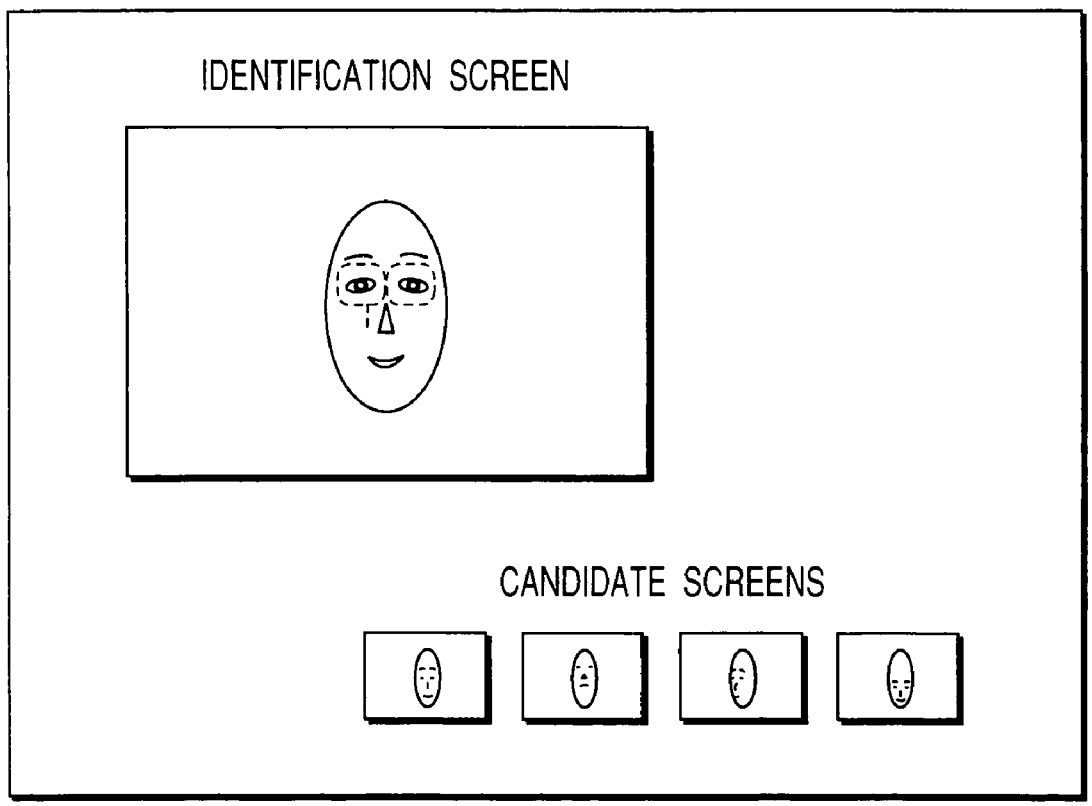
FIG. 6 shows a display example of the display device.

In the above embodiments, face information representing a plurality of face patterns regarding the same person, for example, frontal face, oblique face and face wearing glasses are included in the dictionary. The face patterns are read out from the dictionary and verified with the object face in identifying or classifying. Concretely, a classification screen and candidate screens are displayed on a display device of the personal identification apparatus as shown in FIG. 6. The classification screen displays the face of the object person, and the candidate screens display a plurality of face patterns read out from the dictionary. In this manner, if a plurality of face patterns of the same person are stored in the dictionary, classification accuracy is improved.

In the present invention described above, the time required for comparison between registered persons and an object person can be reduced, and the standby time for comparison of the object person can be shortened by appropriately changing the registration order of the registered persons in accordance with the use situation of the registered persons on, e.g., an access control system.

That is, classification processing can be executed at a higher speed by sorting the verification order of registered persons in various ways or selectively narrowing down the registered persons. For example, a person who frequently uses the system is preferentially stored at a higher-order position in the registered information storage device 2 (the registered persons are arranged in the order of use frequency), thereby shortening the time to search for a registered person related to the classification operation.

Conversely, a person who rarely uses the system is stored at a lower-order position (after the k-th position), and therefore, the classification fails for the first to, e.g., k-th registered persons. However, since the classification processing must be more carefully executed because the use frequency is low, the security can be improved by multiple check.

The administrator can check the use situations of the registered persons or select a defined number of persons to be identified, so the convenience can be improved, and the computation cost can be reduced.

In the above embodiments, although the classification device classifies using only one feature per object person, the security level can be increased by executing classification by simultaneously extracting a plurality of features (specific information of the object person or physical key) from the object person.

The face feature can be extracted by the feature extraction device using any method as far as the feature is necessary for classification.

As for the selection flag, whether the verification is successfully done is determined depending on the presence/absence of the flag. For example, to express and classify a plurality of groups, group names "group A", "group B", "group C", and the like may be described, and the object persons may be selected and classified.

The registered information storage device can register one or a plurality of pieces of information in correspondence with one registered person or one ID code.

In the above embodiments, the present personal identification apparatus is applied to access control for a specific place. However, the present invention can apply to a computer in order to specify a computer operator.

According to the present invention described above, the time required for classification between the registered persons and the object person can be shortened by changing the order of classification of the registered persons.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A personal identification apparatus comprising:
a storage device configured to store specific information pieces of a plurality of registered persons in order;
an extraction device configured to extract a specific information piece of an object person to be identified from a feature of the object person;
an identification device configured to identify the object person from the registered persons by comparing the specific information pieces of the registered persons with the specific information piece of the object person; and
a registered information operation device configured to sort the specific information pieces of the registered persons, which is stored in said storage device, in order of increasing elapse time from a last identification of the object person or in order of decreasing frequency of identification thereof,
wherein when said identification device fails identification between the object person and one of the registered persons, said extraction device extracts another specific information piece of the object person which presents at a lower-order position than the specific information piece extracted from the object person, and said identification device compares the another specific information piece with the specific information piece of each of the registered persons to verify the specific information piece.

2. A personal identification apparatus comprising:
a storage device configured to store specific information pieces of a plurality of registered persons in order;
an extraction device configured to extract a specific information piece of an object person to be identified from a feature of the object person;
an identification device configured to identify the object person from the registered persons by comparing the specific information pieces of the registered persons with the specific information piece of the object person; and a registered information operation device configured to sort the specific information pieces of the registered persons, which is stored in said storage device, in order of increasing elapse time from a last identification of the object person or in order of decreasing frequency of identification thereof, wherein said identification device performs verification for only information pieces at higher-order positions in accordance with the order of sorted information pieces.

3. The apparatus according to claim 2, wherein said identification device performs retry by comparing information present at a lower-order position in said storage device with the specific information piece of the object person when said identification device fails verification between the specific information pieces stored in said storage device and the specific information piece extracted in said aid extraction device.

4. The apparatus according to claim 2, wherein said identification device calculates a similarity between each of a given number of information pieces read out from said storage device and the specific information piece of the object person to obtain a plurality of similarities, and selects a maximum similarity from the similarities to obtain an identification result.

5. The apparatus according to claim 2, wherein said identification device performs retry by collating a feature extracted newly by extraction device with each of features of the specific information pieces read out from storage device when said identification device fails verification between the specific information pieces stored in said storage device and the specific information piece extracted by said extraction device.

6. A personal identification method, comprising:

storing specific information pieces of a plurality of registered persons in order in a storage device;

extracting a specific information piece of an object person from the object person;

identifying the object person by comparing the specific information pieces of the registered persons with the specific information niece of the object person, and sorting the specific information pieces of the registered persons in the storage device, in order of increasing elapse time from a last identification of the object person or in order of decreasing frequency of identification thereof, which includes, when the identifying fails, performing retry operation of the identifying using the specific information piece of the object person, or another specific information piece of the object person, which presents at a lower-order position than the specific information extracted for the object person from the object person.

* * * * *